(12) United States Patent
Yamada et al.

(10) Patent No.: US 7,562,352 B2
(45) Date of Patent: Jul. 14, 2009

(54) DATA FORMAT CONVERSION METHOD AND EQUIPMENT, AND CONTROLLER MANAGEMENT SYSTEM USING DATA FORMAT CONVERSION EQUIPMENT

(75) Inventors: Tsutomu Yamada, Hitachi (JP); Masahiko Saito, Mito (JP); Shoji Suzuki, Hitachi (JP); Hiromichi Endoh, Hitachi (JP); Noritaka Matsumoto, Hitachi (JP); Hirokazu Kasashima, Hitachi (JP); Manabu Yamauchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 439 days.

(21) Appl. No.: 10/613,211

(22) Filed: Jul. 7, 2003

(65) Prior Publication Data

US 2004/0006401 A1 Jan. 8, 2004

(30) Foreign Application Priority Data

Jul. 8, 2002 (JP) ............................. 2002-198773

(51) Int. Cl.
*G06F 9/45* (2006.01)
(52) U.S. Cl. .................................................. 717/136
(58) Field of Classification Search .................. 717/136
See application file for complete search history.

(56) References Cited

U.S. PATENT DOCUMENTS

| 5,878,422 | A | * | 3/1999 | Roth et al. ................... 707/100 |
| 6,219,831 | B1 | * | 4/2001 | Ono ............................. 717/136 |
| 6,256,068 | B1 | * | 7/2001 | Takada et al. ................ 348/441 |
| 6,405,366 | B1 | * | 6/2002 | Lorenz et al. ................ 717/107 |
| 6,671,701 | B1 | * | 12/2003 | Chouinard ................... 707/201 |
| 6,820,266 | B1 | * | 11/2004 | Minakawa et al. ........... 719/313 |
| 2002/0091709 | A1 | * | 7/2002 | Jung ........................ 707/104.1 |
| 2002/0184618 | A1 | * | 12/2002 | Bala et al. .................... 717/148 |
| 2003/0179112 | A1 | * | 9/2003 | Parry et al. .................... 341/50 |
| 2005/0080755 | A1 | * | 4/2005 | Aoyama ......................... 707/1 |

* cited by examiner

*Primary Examiner*—John Chavis
(74) *Attorney, Agent, or Firm*—Brundidge & Stanger, P.C.

(57) ABSTRACT

The invention contemplates to improve versatility or flexibility of a system for managing a controller. In a data format converter, a computer constitutes reception unit for acquiring input information containing a program, etc, of a first data format and outputted from a programmer unit, direction extract unit for extracting a convert direction of a data format contained in the input information so acquired, data conversion rule acquisition unit for acquiring a conversion rule of a data format corresponding to the convert direction so extracted and convert execution means for converting the program, etc, of the first data format to a second data format. The program, etc, of the second data format converted is outputted to the controller. The program, etc, can be created in this way in an arbitrary data format different from the data format of the controller.

7 Claims, 12 Drawing Sheets

FIG. 2

```
1 :    <?xml version="1.0"?>
2 :    <!DOCTYPE PLCSRC SYSTEM "someURL/plc.dtd">
3 :    <PLCSRC>
4 :        <DESCRIPTION>
5 :            <TYPE>CTL-A</TYPE>
6 :            <DEST>192.168.1.1</DEST>
7 :            <SRC>192.168.1.2</SRC>
8 :        </DESCRIPTION>
9 :        <PRG>
10:            <!-- Program HERE -->
11:        </PRG>
12:    </PLCSRC>
```

FIG. 3

```
5 :            <TYPE SRC="XML-C" DEST="MAC-4">EQ-XY</TYPE>
```

FIG. 4

| TYPE NAME (120) | OBJECT CONTROLLER (121) | PRE-CONVERSION FORMAT (122) | POST-CONVERSION FORMAT (123) |
|---|---|---|---|
| CTL-A | A TYPE CONTROLLER | MAC-1 | MAC-2 |
| EQ-XY | XY SPECIFICATION-BASED APPARATUS | MAC-3<br>XML-C<br>LANG-D | MAC-4<br>XML-E |

```
1 :   <?xml version="1.0"?>
2 :   <!DOCTYPE PROFILE SYSTEM "someURL/profile.dtd">
3 :   <PROFILE>
4 :       <RULE>
5 :           <ORG>Start</ORG>
6 :           <CNV>B</CNV>  <!-- B stands for Begin -->
7 :       </RULE>
8 :       <RULE>
9 :           <ORG>Finish</ORG>
10:           <CNV>E</CNV>  <!-- E stands for End -->
11:       </RULE>
12:       ...
13:   </PROFILE>
```

DATA FORMAT CONVERSION METHOD AND EQUIPMENT, AND CONTROLLER MANAGEMENT SYSTEM USING DATA FORMAT CONVERSION EQUIPMENT

BACKGROUND OF THE INVENTION

1. Field of the Invention

This invention relates to a data format conversion method and equipment for converting a data format such as a program to a different data format. More particularly, the invention relates to a data format conversion method and equipment suitable for a controller management system for managing a controller having an embedded computer (hereinafter called merely "computer"), particularly a controller management system for managing a controller from a remote place.

The term "program, etc." used in this specification means programs and electronic information analogous to the programs. The term "program" means also directions to a computer that are so combined with one another as to acquire one result. The term "electronic information analogous to programs" means information that is used for processing by a computer. The term "data format" means formats of languages and description of programs and data structures. The term "management of controller" includes monitoring and management of a controller from a remote place through a communication network besides management such as preparation, edition, re-writing, etc, of programs of a computer embedded into the controller.

2. Description of the Related Art

Programmable controllers and programmable logic controllers (PLC) having an embedded computer (hereinafter called merely "controller") have gained a wide application. When a program is installed or re-written to or in the computer of such a controller, it has been customary to connect a dedicated programmer unit to the embedded computer through cables and to transfer a program created by the dedicated programmer unit to the computer.

However, the functions of the dedicated programmer unit have quickly been antiquated due to innovation and progress of computer technologies, and it has become difficult to secure a dedicated programmer unit capable of coping with a variety of controllers. Some of the controllers for controlling infrastructure facilities have continuously been operated for a long term of 15 years or more, and management of such controllers must also be made for a long term. Conventionally, it has been necessary to secure in advance a dedicated programmer unit by estimating possible troubles so that the controllers can be managed for 15 years or more. Therefore, efficiency of cost and improvement of performance have left problems yet to be solved.

To solve such problems, JP-A-11-24716 (hereinafter called "prior art 1") proposes a management system using personal computers (PC) excellent in versatility and cost performance and communication application technologies typified by the Internet. In this prior art 1, an HTTP (Hyper Text Transfer Protocol) server is mounted to a user controller and a programmer acquires HTML (Hyper Text Markup Language) data from the controller through a Web browser of the PC and controls the program of the controller in accordance with the HTML data so acquired.

To improve controller management efficiency, standardization of description languages of programs has been required. To satisfy this requirement, U.S. Patent Application Publication US2002/0004804A1 (hereinafter called "prior art 2") proposes to describe a program by a markup language. In this prior art 2, XML (Extensible Markup Language) is picked up as an example of the markup languages, and a programmer unit converts a program created by an editor to an XML type program and transfers it to a controller. The controller stores the XML type program in its own memory device, interprets the program by control execution means inside the controller and controls a controlled target. Incidentally, XML is a data standard stipulated by W3C (World-Wide Web Consortium) as a standardization organization. The XML is expected to be a promising standard used for a long time as a data standard employed in networks.

On the other hand, JP-A-2001-350507 (hereinafter called "prior art 3") discloses a technology for parsing data described in a markup language at a communication terminal having limited performance in connection with the communication terminal having a built-in browser for establishing an interface with people. In other words, a network interface is interposed in a route in which the communication terminal acquires data described by WML (Wireless Markup Language) from an HTTP server. The network interface includes WAP gateway means for converting a WML source acquired from the HTTP server to a content of compiled WML before the WML source is transmitted to the communication terminal. When a user of the communication terminal requires the WML information to the HTTP server, the network interface compiles the WML source and transmits the result to the communication terminal. In consequence, even the communication terminal having limited processing capacity can peruse the data described by the markup language.

On the other hand, computers connected to a communication network have been embedded to fields or products for which such application has not been possible in the past, due to the progress of semiconductor process technology and communication network technology. It is hereby of importance that such an embedded computer minimizes an operation cost. Therefore, the embedded computers generally have limited functions and less expansibility when they are embedded. In other words, the function of the computers is specified to a specific control before embedding. Services for executing control including monitoring irrespective of time and place have gradually become available by using such embedded computers in combination with a communication network and communication terminals.

However, problems have remained yet to be solved so as to program, monitor and control the embedded computers from the communication network. The controller management system proposed in the prior art 1 is not free from the problem that control is limited to the content of the HTML data stored in the controller.

To solve this problem, it may be possible to utilize a CGI (Common Gateway Interface) as one of the technologies for expanding the HTTP function, for example.

In this case, the HTTP server must have the CGI function as well as a sufficient processing capacity, but it is not realistic to furnish the embedded computer with the CGI function and the processing capacity. In addition, flexibility drops because the CGI program must be registered to the HTTP server whenever a necessary function is added. SSI (Server Side Include), JSP (Java (trademark) Server Page), and so forth, are available as the technology for expanding the server function besides the CGI but they involve the same problem.

On the other hand, the controller management system proposed in the prior art 2 uses a markup language as the program. Therefore, it is necessary to conduct a validation/validity check whether or not the data structure described is coincident with data definition. The validation/validity check is necessary particularly in the case of the XML. Since the XML is described by a text, the embedded computer cannot directly utilize the XML. Therefore, processing for extracting information that the embedded computer can utilize from the text description is necessary.

However, the processing of the types described above is temporary processing, and it is not desirable to improve a calculation processing capacity only for such a processing in the embedded computer for which the minimum operation cost is preferentially required. In the programmer unit, on the other hand, XML conversion means corresponding to each controller must be prepared, and the controller management system cannot easily cope with different kinds of controllers manufactured by different manufacturers.

In the gateway apparatus disclosed in the prior art 3, correspondence to the language compiled from the source is primarily determined.

As described above, the languages to which the controllers having a variety of embedded computers can correspond are individually determined. Therefore, development of a programmer unit having high flexibility and high versatility and capable of programming through a communication network, etc, has been desired for controllers having a variety of embedded computers.

SUMMARY OF THE INVENTION

It is therefore a first object of the invention to provide data format conversion equipment for converting a data format of a program, etc, to a different data format.

It is a second object of the invention to improve versatility or flexibility of a system that manages a controller.

It is a third object of the invention to achieve a system that manages and controls a controller from a remote place.

The invention solves the problems described above by using the following means.

Data format conversion equipment according to the invention acquires input information containing a program, etc, of a first data format, converts the program, etc, of the first data format to a program, etc, of a second data format on the basis of a conversion direction of a data format contained in the input information and outputs the program, etc, so converted. In other words, a programmer who creates the program, etc, of the first data format inputs a message having a direction for converting the program, etc, so created to the second data format to the data format conversion equipment.

Assuming that a control program of a controller has a second data format, for example, in the data format conversion equipment according to the invention, the programmer who creates a control program by a first data format having readability and high affinity with a computer and easily programmable such as a markup language can automatically convert the control program to a control program of a second data format. In consequence, the programmer can easily conduct management such as creation, modification, edition, re-writing, etc, of a control program of an existing controller even when the programmer is not well skilled in the second data format and even when a dedicated programmer unit suitable for the controller is obsolete. Moreover, because the program, etc, can be created by an arbitrary data format different from the data format of the controller and because a computer having versatility and openness (such as personal computers) can be used, versatility or flexibility of the system for managing the controller can be improved.

The data format conversion equipment according to the invention may further include memory means for storing a conversion rule for converting the program, etc, of the first data format to the program, etc, of the second data format, wherein the memory means stores a plurality of conversion rules for executing conversion to a plurality of different second data formats in such a manner as to correspond to at least one first data format.

In this case, when the memory means is provided outside the data format conversion equipment and the conversion rules are acquired from the memory means through communication means, a plurality of controllers of the same or different kinds can be managed from a remote place.

More concretely, the data format conversion equipment according to the invention can be achieved by a computer that constitutes reception means for acquiring input information containing a program, etc, of a first data format from a communication network; direction extract means for extracting a convert direction of a data format contained in the input information so acquired; data conversion rule acquisition means for acquiring a conversion rule (such as a conversion program) of a data format corresponding to the convert direction extracted; convert execution means for converting the program etc, of the first data format to a program, etc, of a second data format on the basis of the conversion rule acquired; and transmission means for outputting the converted program etc, to the communication network. The data format conversion equipment may further include memory means for storing a conversion rule for converting the program, etc, of the first data format to the program, etc, of the second data format, wherein the memory means stores a plurality of conversion rules for executing conversion to a plurality of different second data formats in such a manner as to correspond to at least one first data format, and the data conversion rule acquisition means acquires a conversion rule corresponding to the convert direction from the memory means.

In this case, the data conversion rule acquisition means can acquire the conversion rule stored in memory means provided outside from the communication network through the reception means. The memory means provided outside may be either memory means connected to the communication network in such a manner as to be capable of communication, or memory means provided to a controller having an embedded computer connected to the communication network in such a manner as to be capable of communication.

In this case, the conversion program may be first converted to a third data format different from the second data format and then to the second data format. The convert execution means in this case may comprise a virtual machine and intermediate conversion means for conducting conversion to the third data format. The virtual machine may be a virtual machine of Java.

A programmer unit according to the invention includes input means for inputting convert direction for converting a program, etc, of a first data format to a second data format, and the convert direction can be added to a message transmitted to the data format converter. In this case, the programmer unit can be accomplished by use of a computer assembled into a mobile communication terminal.

A controller for controlling a controlled target in accordance with a program, etc, of a predetermined second data format may comprise a computer that constitutes memory means for storing a program, etc, of a first data format inputted through a communication network, and a function of outputting the program, etc, of the first data format stored in the memory means in response to a request inputted through the communication network. According to this construction, the controller stores the program, etc, of the first data format created by the programmer unit. Therefore, the programmer unit need not store the program, etc, of the first data format, and an arbitrary different programmer unit can manage the program, etc, of the controller.

The controller management method and system according to the invention can be achieved when the controller management equipment including the programmer unit and the data format converter described above is connected to a target controller either directly or through the communication network.

When the controller is directed to household electrical products as the controlled target, the controller having the household electrical products as the controlled target is connected to the communication network in such a fashion as to be capable of communication and a mobile communication terminal such as a cellular telephone unit is used as the programmer unit. The programmer unit calls the data format converter and sends the control program to the controller. In this way, the control program of the household electrical products can be changed from the cellular telephone unit.

BRIEF DESCRIPTION OF THE DRAWINGS

FIG. 2 shows an example of an XML format message outputted from a programmer unit according to the invention;

FIG. 3 shows a modified example of the XML format message shown in FIG. 2;

FIG. 4 is an explanatory view for explaining a data format of a message before conversion in contrast with a data format of the message after conversion;

DESCRIPTION OF THE EMBODIMENTS

Preferred embodiments of the invention will be hereinafter explained.

First Embodiment

Figure 1:
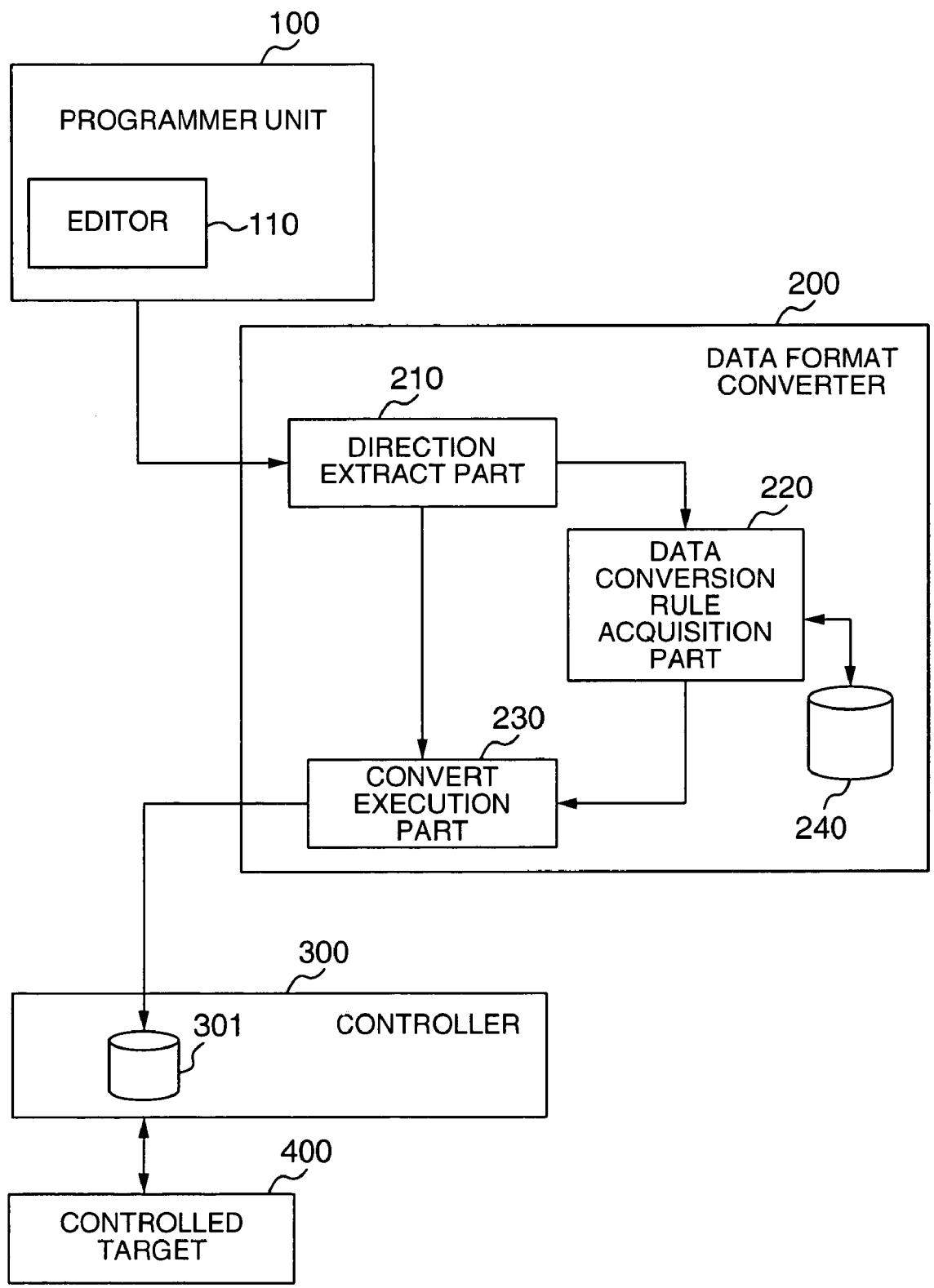
FIG. 1 is a block diagram showing an overall construction of a controller management system according to a first embodiment of the invention.

FIG. 1 shows an overall construction of a controller management system according to a first embodiment of the invention. The controller management system according to the invention includes management equipment including in turn a programmer unit 100 and a data format converter 200, a controller 300 of a management target and a controlled target 400 controlled by the controller 300 as shown in the drawing.

The programmer unit 100 creates programs, etc, executed by the controller 300 and includes an editor for creating the programs, etc. The term "program, etc" means programs and electronic information analogous to the programs as previously defined, and includes all information used for processing by computers. The programmer unit 100 creates management control information (hereinafter called "message") of the controller including the programs created by the editor 110, and outputs the message to the data format converter 200. The message as the management control information of the controller includes a controller type for specifying the kind of the controller 300 as the management target, identification data such as the address of the controller, and other information besides the programs.

Here, the programmer unit 100 preferably comprises a computer having versatility and openness such as a personal computer (PC) from the aspect of future acquisition of components. The editor 110 preferably comprises a program operating on the PC. However, the programmer unit 100 is not particularly limited to their combination. For example, a Web application operating on a Web browser of the PC can be applied as an editor program. This makes it possible to enjoy easy-to-use Web browser performance and independence of an execution platform. In the case of a controller 300 having a small number of input/output points (not greater than dozens of input/output points, for example), the programmer unit 100 may comprise a combination of buttons and a simple display such as a cellular telephone unit.

The data format converter 200 includes a direction extract part 210, a data conversion rule acquisition part 220, a convert execution part 230 and a memory device 240. The direction extract part 210 has a function of checking whether or not a data structure of the message received from the programmer unit 100 is valid and a function of appropriately extracting target information from the message. When the data format of the message is of the XML type, for example, an XLM parser is provided to the direction extract part 210 to judge validity of the data structure. The data conversion rule acquisition part 220 reads out a conversion program corresponding to a designated controller type in accordance with controller type information extracted by the direction extract part 210, and transfers the corresponding conversion program to the convert execution part 230. The function of the convert execution part 230 is set, or the convert execution part 230 is activated, on the basis of the conversion program read out by the data conversion rule acquisition part 220, and the program received by the direction extract part 210 is converted to a program suitable for the controller 300. In other words, the convert execution part 230 converts the data format of the program, etc, of the message to a program, etc, of the data format suitable for the controller 300. The memory device 240 stores the conversion program in such a fashion as to correspond to the data formats of various controllers to which the management system of this embodiment is directed.

The controller 300 receives the message outputted from the data format converter 200 and stores it in the memory device 301. The controller 300 controls the control target 400 in accordance with an operation set in advance or with the message received. The control target 400 includes plant and production lines, infrastructure systems, household electrical appliances, and so forth. Concrete examples of the control target 400 include discrete input/output contacts, analog input/output, field networks, machinery such as servo-amplifiers, general household electrical appliances such as air conditioners, washing machines, monitor cameras, and control elements. Infrared rays, wireless communication, power lines, private control lines, etc, can be utilized as interfaces for controlling the general household electrical appliances.

As described above, the programmer unit according to the prior art creates a program suitable for the data format of the controller and directly transfers it to the controller. In contrast, the programmer unit 100 in this embodiment shown in FIG. 1 creates a program, etc, in an arbitrary data format. The data format converter 200 converts the program, etc, so created to the data format suitable for the controller 300 and transfers it to the controller 300. In other words, in this embodiment, the message comprising the program, etc, for controlling the controller 300 is created in the programmer unit 100. The data format or structure constituting the message is binary data or text data, but the XML type data structure is preferably employed as the text data. Though redundant, the XML format is more excellent in readability that enables people to read and understand data than machine codes, and can be handled more easily by computers such as the PC. The embodiments of the invention will be hereinafter explained about the XML type message by way of example but is not naturally limited thereto.

FIG. 2 shows an example of the message described in the XML format and outputted from the programmer unit 100. In the drawing, a digit and a colon at the start of each row are put for the purpose of explanation and do not constitute the message of the XML format. Incidentally, the grammatical stipulation of the XML is described in detail in the Web site (URL=http://www.w3c.org/) laid open by W3C and in "Easy-to-Understand Basis of XML" (published by Nikkei-BP Co., original author: Simon St. Laurent, translator: Fujimoto Yoshiko). Therefore, the detail explanation will be hereby omitted.

In FIG. 2, the first row is an XML declaration. It represents that the message is described by the XML format. The second row is a document type declaration. It represents that the data structure of this message is defined in a document type definition file (hereinafter called "DTD") expressed by "someURI/plc.dtd". The direction extract part 210 acquires the DTD hereby designated and checks whether or not the data structure of the message received is suitable for the DTD. The third row is a start tag representing the main body portion of the message. It forms a pair with an end tag of the $12^{th}$ row. The message main body portion is divided into two parts, that is, description starting from the fourth row and description starting from the ninth row. The fourth row is the start tag of a data part for supplementing the program, and forms a pair with an end tag of the eighth row. The fifth row describes the controller type as the target to which the message is converted. The sixth row describes the address of the controller as the transmission destination of the message. The seventh row describes an identification code of a transmitting party that transmits the message. In this embodiment, the transmission destination and the transmitting party of the sixth and seventh rows are expressed by the IP address by way of example. However, the IP address is dependent on a network media through which the message is transmitted, and the information is not limited so long as it can specify the apparatus. A data type is preferably designated as an attribute of the tag. In the case of an IPv4 address, for example, it is described as <DEST type="IPv4">. The ninth row is the start tag of the program main body, and forms a pair with the $11^{th}$ row. The tenth row describes a program for controlling the controller 300. In this embodiment, it is possible to list up operations for the target as stipulated by SOAP (Simple Object Access Protocol), though the detailed explanation is hereby omitted.

When the data format shown in FIG. 2 is employed, it becomes possible to designate the content to be processed and at the same time, to describe the program, etc, for controlling the controller 300. It is also possible to achieve readability by people and data availability by computers. Incidentally, addition, omission and modification of data are possible in the data format shown in FIG. 2 so long as necessary information exists. For example, when the data format of the message is "well formed" alone, the document type declaration of the second row can be omitted.

Incidentally, when the message has the well-formed format, the direction extract part 210 preferably checks whether or not the message has the well-formed format by using a non-validation verification parser. When the message contains a schema definition of the second row in FIG. 2, the direction extract part 210 must check whether or not the message is coincident with the schema definition by using a validation verification parser.

FIG. 3 shows a modified example of the message shown in FIG. 2. The message shown in FIG. 3 is a part of the message described in the XML format, outputted from the programmer unit 100 and corresponds to the fifth row in FIG. 2. In this example, the data format before conversion or the data format after data conversion is designated by the message so that conversion of the data format in the data format converter 200 can be reliably executed. In other words, the data format before conversion is designated by an "SRC" attribute and the data format after conversion, by a "DEST" attribute. In this example, the format before conversion is a type "XML-C", the format after conversion is a type "MAC-4" and a controller of a type "EQ-XY" is designated. Incidentally, these symbols are arbitrarily employed for the purpose of explanation.

When a plurality of data formats can be selected as the message format before conversion or as the message format after conversion as shown in FIG. 3, attribute designation is suitably made to designate the data format. When a message without attribute designation is inputted although a plurality of formats before conversion or formats after conversion exists, it is preferred to convert the message by applying a predetermined data format, or not to conduct message conversion by regarding the message as an error. To apply the set data format or to process the message as the error, DTD or other schema designation, for example, may be employed for setting.

FIG. 4 shows the data format of the message before conversion in contrast with the data format of the message after conversion. The drawing explains conversion of the XML format message and shows a target controller 121 as the management target, a pre-conversion format 122 and a post-conversion format 123. In the case of a type CTL-A shown in the drawing, the message is converted from the pre-conversion format "MAC-1" to the post-conversion format "MAC-2" so as to cope with an "A type controller". In the case of a type EQ-XY, any of the pre-conversion formats "MAC-3", "XML-C" and "LANG-D" is converted to either of the post-conversion formats "MAC-4" and "XML-E" so as to cope with an "XY specification based apparatus".

The data formats before or after conversion includes the machine code peculiar to the controller that is expressed as "MAC-" in the drawing, the XML format agreed by specific fields or organizations and expressed as "XML-" in the drawing and a specific format expressed as "LANG-" in the drawing. The data format further includes a description language IL (Instruction List) or ST (Structured Text) stipulated by IEC (International Electro-technical Commission) 61131-3 standard, besides the formats described above.

Figure 5:
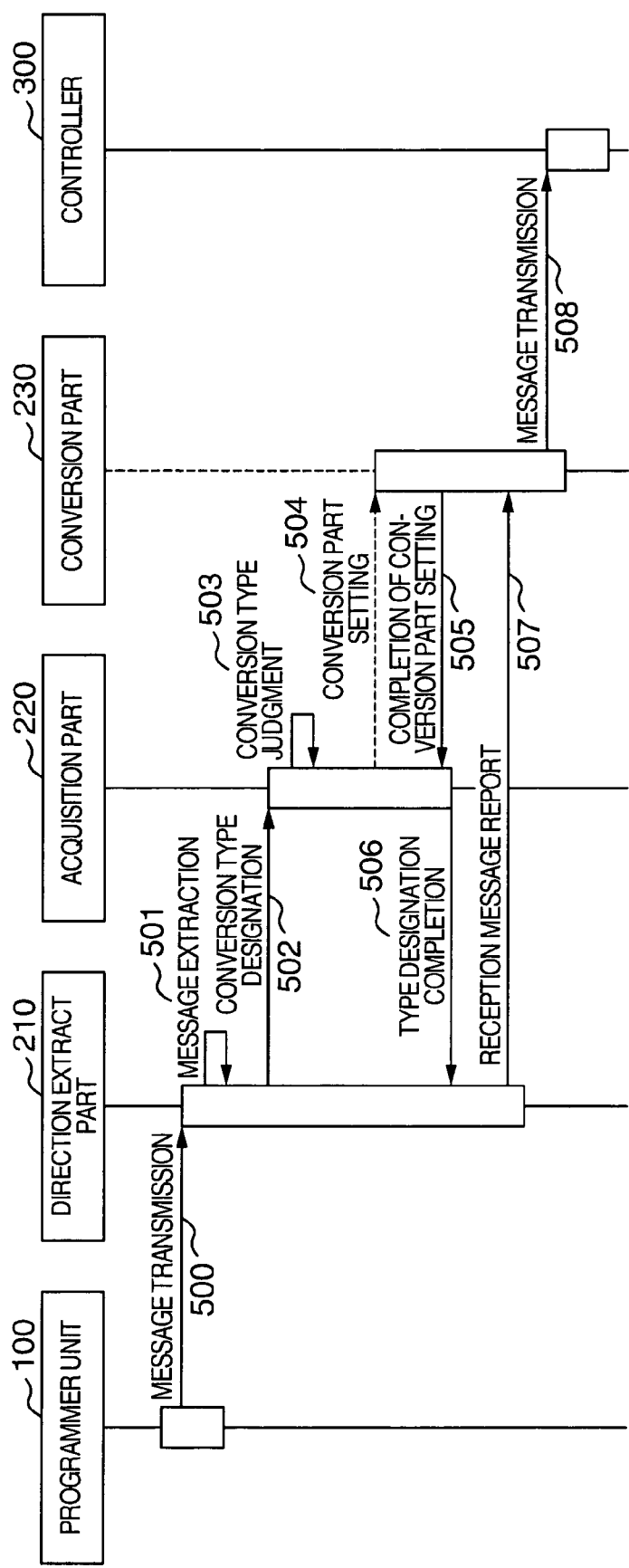
FIG. 5 is a sequence diagram useful for explaining an operation of the controller management system shown in FIG. 1.

FIG. 5 shows a sequence chart of the processing flow in the embodiment shown in FIG. 1. In the sequence chart, the passage of the processing time is indicated from above to below of the drawing. First, the programmer unit 100 transmits the message to the data format converter 200 (event 500). The direction extract part 210 in the data format converter 200 receives the message. To check whether or not the message received is valid, the direction extract part 210 executes message direction extract processing (event 501). Here, validation verification is executed in accordance with the DTD designated by the message, and necessary information is extracted from the XML data. Next, the conversion type of the message is reported to the data conversion rule acquisition part 220 (event 502). The data conversion rule acquisition part 220 judges either directly or indirectly the conversion method of the message from the conversion type reported thereto (event 503). For example, a conversion program stored with the same file name as the conversion type is acquired from the memory device 240. Alternatively, the correlation between the conversion type and the conversion program is first acquired from the database inside the data conversion rule acquisition part 220 and then the conversion program is acquired from the memory device 240. The data conversion rule acquisition part 220 thereafter sets the convert execution part 230 (event 504). For instance, the conversion program corresponding to the conversion type is operated to activate the convert execution part 230. The convert execution part 230 may also be activated through the data conversion rule acquisition part 220 or may be activated in advance. As soon as the convert execution part 230 is ready, the convert execution part 230 reports completion of setting to the data conversion rule acquisition part 220 (event 505). Receiving the report, the data conversion rule acquisition part 220 reports completion of designation of the conversion type to the direction extract part 210 (event 506). The direction extract part 210 transfers the message received or its program part to the convert execution part 230 (event 507). The convert execution part 230 converts the program part of the message in accordance with the conversion program acquired from the data conversion rule acquisition part 220 and transmits the converted message to the controller 300 (event 508). The controller 300 receives the converted message and stores it into the memory device 301. The controller 300 installs or re-writes the program in accordance with the message stored in the memory device 301 and controls the controlled target 400 in accordance with the new program.

The data format converter 200 receives the message created by the programmer unit 100 and executes the conversion processing corresponding to the conversion type designated by the message received in the manner described above. Consequently, the controller 300 can receive the message subjected to the conversion processing.

Therefore, according to the controller management system of this embodiment, the controller 300 receives the message in the data format in the language and description that can be processed by the controller 300 whether or not the message created by the programmer unit 100 may be the XML format. In other words, the controller management of the system of this embodiment can be applied to existing controllers whether or not the controller 300 is compatible to the XML format.

In this embodiment, the direction extract part 210 and the programmer unit 100 and the convert execution part 230 and the controller 300 are respectively connected on the 1:1 basis. In the controller management system shown in FIG. 1, however, the programmer 100 and the data format converter 200 and the data format converter 200 and the controller 300 may be respectively connected through a communication network. In this case, the communication interface of the data format converter 200 may be so fabricated as to be in common to the reception interface for the programmer unit 100 and to the transmission interface for the controller 300. It is further possible to unify the programmer unit 100 and the data format converter 200 and to combine the data format converter 200 and the controller 300 through the communication network.

Incidentally, FIG. 1 shows one programmer unit 100 and one controller 300, but the invention can be also applied to the case where a plurality of programmer units 100 and a plurality of controllers 300 exist.

The data format of the message converted and outputted by the data format converter 200 can be converted to an arbitrary data format when an arbitrary conversion program is stored in the memory device 240. However, subsequent management is easier when the data format is converted to and outputted in the text format. Preferably, the message after conversion has the XML format, too, and is of a simple format such as the well-formed format. In such a case, even a controller 300 having a low processing capacity can be utilized by merely checking the XML format, and management of the message after conversion becomes easier.

A part of the message falls off in some cases due to disturbance before the message is stored in the controller 300 and moreover, this fall-off cannot be discriminated in some cases. Therefore, to verify consistency or identity of the message, it is preferred to provide a check sum inside the message, to simply add text data of the message or to calculate the text data by CRC (Cyclic Redundancy Check), and to transmit the calculation result together with the message to the controller 300. In this case, consistency of the program, etc, can be verified when the text data of the message is calculated again and collated in the controller 300 after it receives the message. Because the check sum system, in particular, can be easily packaged, it can be used appropriately for the controller 300 having a low processing capacity.

When the controller 300 can accept a plurality of different data formats and can execute the direction extract processing, the data format of the program, etc, created by the programmer unit 100 and the data format converted by the data format converter 200 can be optimized to the respective formats while the intension of a programming person and the loads of the data format converter 200 and the controller 300 are taken into consideration. The machine code, the XML format and the specific language format are handled in the explanation give above by way of example, but it is obvious that the invention is not limited to these data formats.

When the data format the controller 300 can interpret is limited to the machine code, the data format converter 200 converts the program, etc, created by the programmer 100 to the machine code. When the controller 300 has the direction extract function of the XML format and the HTML format, the data format converter 200 convert the program, etc, to the XML format or the HTML format. The direction extract function of the data format of the controller 300 can be identified in accordance with controller type information. Therefore, the data format converter 200 identifies the conversion type on the basis of the controller type information contained in the message received from the programmer 100 unit and converts the message received from the programmer unit 100 by use of the conversion data so set as to correspond to the conversion type identified.

In the embodiment described above, the data format converter 200 has the conversion data of the data format of the program, etc, and converts the message received from the programmer unit 100 and transfers it to the controller 300 by use of the conversion data converted to the data format of the controller 300 on the basis of the controller type information outputted from the programmer unit 100. Therefore, this embodiment provides the following effects.

(1) Because the data format converter 200 is developed, the programmer unit 100 can create the program, etc, of the controller by use of the markup language that the person creating the program, etc, can easily handle, irrespective of the data format of the controller 300. In other words, the programmer unit 100 has high affinity with the computer, can use a data format having high readability and can easily cope with the change of an easy-to-use data format besides the markup language.

(2) Even when the controller 300 is of an existing obsolete type, the latest programmer unit 100 can manage the program, etc, of the controller 300 without the necessity for increasing the processing capacity of the embedded computer. In other words, the function required for the controller 300 is only at least the message reception function that has already been provided to the existing controller 300. Therefore, the invention can be achieved at a low cost, and versatility or flexibility of the management system for managing the controller 300 can be improved.

(3) Particularly when the data format converter 200 and the controller 300 are connected to each other through the communication network in such a fashion as to be capable of mutual communication, a remote control system for monitoring and controlling the controller 300 from a remote place can be achieved.

(4) Because popular personal computer having high openness can be utilized as the programmer unit 100, component management for failure can be made easily.

Second Embodiment

Figures 6, 7:
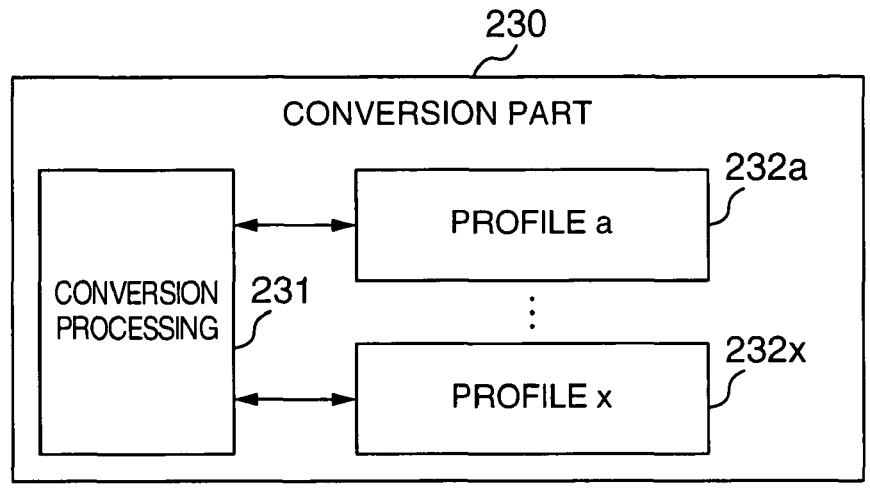
FIG. 6 is a block diagram showing a concrete construction of a convert execution part according a second embodiment of the invention.
FIG. 7 shows an example of a conversion profile used in the convert execution part shown in FIG. 6.

FIG. 6 shows a convert execution part according to another embodiment of the invention. The construction other than the convert execution part 230 is the same as that of the embodiment shown in FIG. 1. The convert execution part 230 includes a convert processing part 231 for actually executing a convert processing and profiles 232a to 232x describing a data conversion rule. The convert processing part 231 receives a message and converts the message in accordance with the conversion rule described in the profiles 232a to 232x. Each profile is prepared for each conversion type. A convenient storage system of the profiles may be the one that stores the conversion type as a file name in a file system, for example, and this system can be managed easily. Another system acquires correspondence between the conversion type and the conversion program and then looks up the profile. In this way, this system can flexibly manage the conversion type and the profile. Because this embodiment prepares each profile for each conversion type, the embodiment can increases the types of the applicable controllers without changing the function of the convert processing part 231.

FIG. 7 shows an example of the profile. Though the drawing shows the example of the profile described in the XML format, the embodiment is not limited to the XML format so long as the data format satisfies predetermined requirements. Digits and colons at the start of rows are added for the purpose of explanation and are not necessary for the XML format message. The first row is the XML declaration and represents that the message is XML format data. The second row is the document type declaration and represents that the data structure of the message is defined in the file expressed as "someURI/profile.dtd". The third row is the description start tag of the profile main body and forms a pair with the end tag of the $13^{th}$ row. The fourth row is the start tag of the rule for associating a keyword and forms a pair with the end tag of the seventh row. The fifth and sixth rows represent that the keyword "start" is replaced by the keyword "B". Similarly, the ninth and tenth rows represent that the keyword "Finish" is replaced by the keyword "E".

This embodiment represents that the keywords are replaced on the 1:1 basis. On the other hand, the convert processing function 231 can execute a processing for interpreting semantics of the keywords and replacing them by corresponding character strings by looking up an external database. When the semantics are interpreted, the profiles can absorb the width of the keywords. Consequently, the number of profiles and eventually, a capacity of a memory for storing the profiles, can be reduced.

When the data structure shown in FIG. 7 is employed, a conversion database (profile) necessary for each controller type can be readily prepared in such a fashion as to correspond to the message transmitted from the programmer 100. Incidentally, in the data structure shown in FIG. 7, addition, omission and modification of the data can be made in the invention so long as necessary information exists. For example, the document type declaration of the second row can be omitted when the data is required to be only of the well-formed type.

As described above, this embodiment can provide the same effect as that of the embodiment shown in FIG. 1.

Third Embodiment

Figure 8:
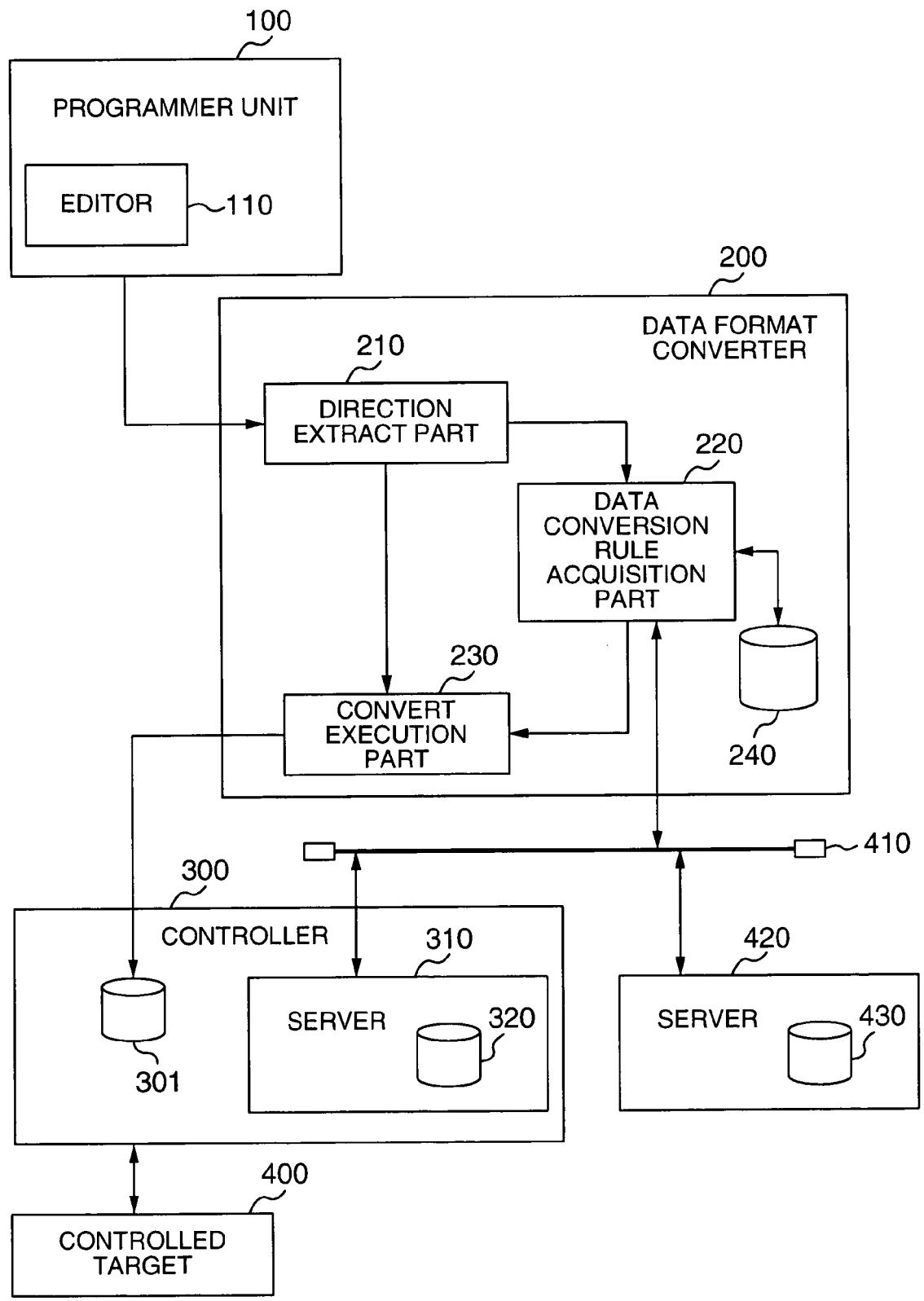
FIG. 8 is a block diagram showing an overall construction of a controller management system according to a third embodiment of the invention.

FIG. 8 shows an overall construction of a controller management system according to still another embodiment of the invention. The differences of this embodiment from the embodiment shown in FIG. 1 reside in that the controller 300 includes a server 310 and a memory 320, or a server 420 and a memory 430 are prepared outside the controller 300, and these servers 310 and 420 are communicated with the data conversion rule acquisition part 220 through the communication network 410 in such a fashion as to communicate with one another. Incidentally, this embodiment may well include at least one of the servers 310 and/420.

The memory 320 or 430 stores the conversion program or the profile (hereinafter called "conversion object") of the aforementioned embodiments. The server 310 or 420 has a function of transferring the conversion object from the memory 320 or 430 upon request. The memory 320 has at least one conversion object necessary for the controller 300. Incidentally, the memory 430 stores a plurality of kinds of conversion objects. In consequence, it is not necessary to preserve the conversion object for each controller 300.

Figure 9:
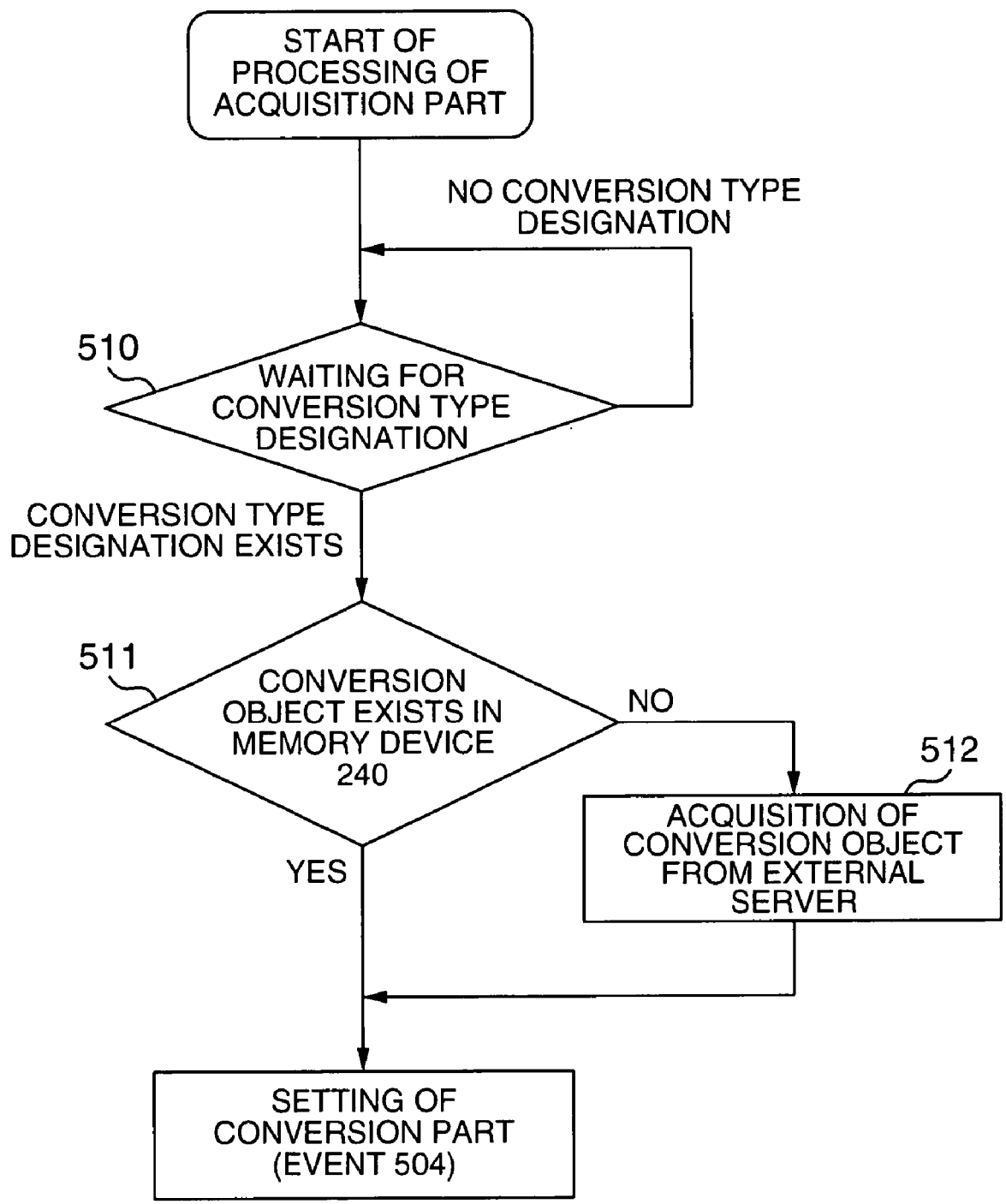
FIG. 9 is a flowchart showing a processing sequence of a data conversion rule acquisition part in the embodiment shown in FIG. 8.

Next, the flow of processing in this embodiment will be explained with reference to the flowchart shown in FIG. 9. The processing in this embodiment is the same as the processing shown in FIG. 5 with the exception of the operation of the data conversion rule acquisition part 220. FIG. 9 shows the operation of the data conversion rule acquisition part 220. The data conversion rule acquisition part 220 is a block that remains under a standby state until designation of a conversion type (event 502) is inputted (processing 510). When the data conversion rule acquisition part 220 receives designation of the conversion type (event 502) and sets the convert execution part, it checks whether or not the corresponding conversion object exists in its own memory 240 (processing 511). When the conversion object does not exist, the data conversion rule acquisition part 220 requires the server 310 or 420 the conversion object through the network 410 (processing 512). Designation of the server 310 or 420 is preferably made as the destination of the message or as the attribute of the tag of the conversion type in the sixth row in FIG. 2, for example. Receiving the request for the conversion object, the server 310 or 420 returns the requested conversion object. When the requested conversion object does not exist in the server, the server can redirect the request to other servers. In consequence, management of the server 310 or 420 becomes more flexible. When the data conversion rule acquisition part 220 receives the conversion object or when the conversion object exists in the memory 240 of its own, the data conversion rule acquisition part 220 sets the convert execution part 230 by use of the conversion object (event 504). The subsequent processing is the same as the processing after the event 505 in FIG. 5.

According to this embodiment, conversion of the data format can be made even when the conversion object corresponding to the conversion type does not exist in the data format converter 200. Because the controller 300 holds the conversion object of the data format, the program system not dependent on the programmer unit 100 can be accomplished. When a manufacturer of the controller 300 manages the server 420 holding the conversion object, for example, users utilizing the controller 300 need not keep the memory 320 for storing the conversion object inside the controller 300.

According to this embodiment, mounting of the memory 240 can be omitted in the data format converter 200, the construction of the data format converter 200 can be simplified and its cost can be reduced. The data format converter 200 can be operated flexibly when a function of transmitting the conversion object is merely added to the controller 300.

Fourth Embodiment

Figure 10:
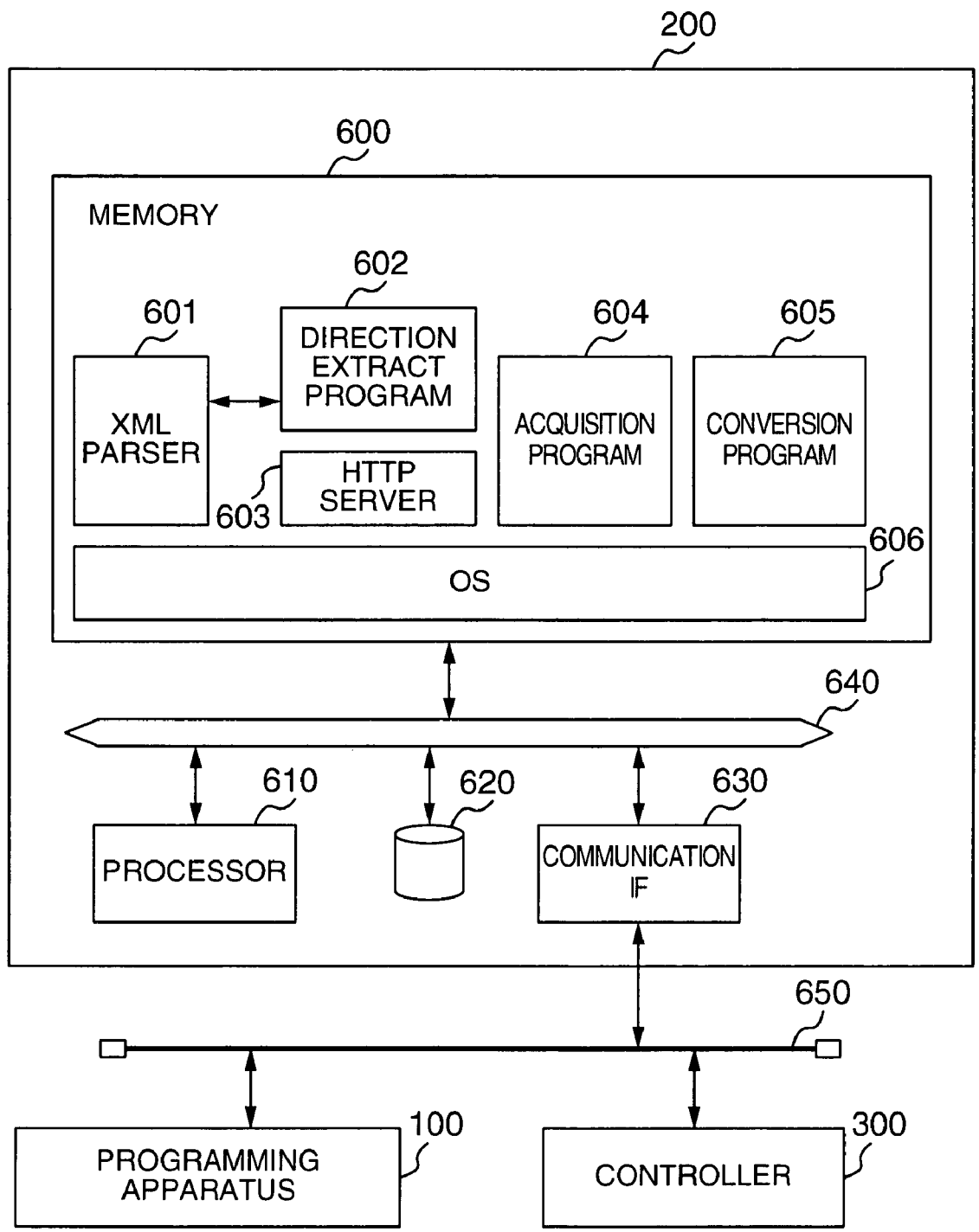
FIG. 10 shows an overall construction of a control management system according to a fourth embodiment of the invention, particularly a detailed construction of a data format converter.

FIG. 10 shows an example of a detailed construction of a data format converter 200 according to still another embodiment of the invention. The data format converter 200 includes a memory 600 for storing and executing a program, a processor 610 for executing a series of processing, a non-volatile memory unit 620 for storing a program and an operating system (OS), a communication interface (IF) 630 for establishing an interface with a communication network 650, and a data bus 640 for transferring data among these elements.

The memory 600 holds an XML parser 601, a direction extract program 602, an HTTP server 603, an acquisition program 604, a conversion program 605 and an OS 606, and also holds stacks, heaps and buffers (all not shown) used for these programs. In the fields in which embedded computers are used, there is the case where the non-volatile memory unit 620 has command data of programs to reduce the amount of use of the memory. This embodiment represents an example where the command data of the program is expanded on the memory, but the invention can be executed whether the program may exist in the memory 600 or in the non-volatile memory unit 620. The processor 610 reads and executes the command data of the program on the memory and accomplishes a desired function. To establish communication between the programmer unit 100 and the controller 300, the processor 610 conducts communication through the communication IF 630 and the communication network 650.

A direction extract program 620, an HTTP server 603 and an XML parser 601 respectively correspond to the functions of the direction extract part 210 shown in FIG. 1 or 8. A non-volatile memory unit 620 has also the function of the memory 240. An OS 606 is basic software for executing these programs, and includes drivers for controlling hardware, a software group of a communication protocol, schedulers for managing resources of the programs, and so forth.

Next, the operation of the data format converter 200 shown in FIG. 10 will be explained. The HTTP server 603 receives the message from the programmer 100 unit and activates the direction extract program 602. The direction extract program 602 is suitably mounted as a CGI program of the HTTP server 603. Receiving the message, the direction extract program 602 reports the message described in the XML format to the XML parser 601 and conducts validation check and direction extract. The direction extract program 602 passes the conversion type extracted as a result of direction extract to the acquisition program 604.

The acquisition program 604 retrieves the non-volatile memory unit 620 and acquires the conversion object of the corresponding conversion type. When the conversion object of the corresponding conversion type does not exist in the non-volatile memory unit 620, the acquisition program 604 acquires the conversion object from outside the data format converter 200 through the communication network 650 in accordance with the flowchart shown in FIG. 9. The acquisition program 604 then sets the conversion program 605 by use of the conversion object so acquired. When completion of setting of the conversion program 605 by the acquisition program 604 is reported to the direction extract program 602, the direction extract program 602 reports the message received to the conversion program 605 and requests to convert the message received. The conversion program 605 transmits the converted message to the controller 300.

Not only the program that is described by the machine code of the processor 610 and can be directly executed but also a conversion program described in a platform-independent intermediate language may be used as the conversion program 605. For example, the conversion program 605 comprises a virtual machine (VM) such as Java (trademark) and an intermediate language program such as a Java byte code executed on the virtual machine. When a part dependent on the controller 300 is mounted through the intermediate language program, the conversion program corresponding to the controller 300 need not be prepared for processor architecture of the data format converter 200. The intermediate language program in this case is stored in the memory unit 320 of the controller 300 or in the outside memory unit 430.

Owing to the construction described above, this embodiment can obtain the same effect as the effect of the embodiment shown in FIG. 1 and can additionally manage the controller 300 from a remote place. Because the utilizable programmer is the computer capable of executing the platform-independent language, the programmer unit can be constituted without relaying on the computer architecture and on the OS. As a result, the users of the controller 300 can stably manage the controller 300 for a long time.

Fifth Embodiment

Figure 11:
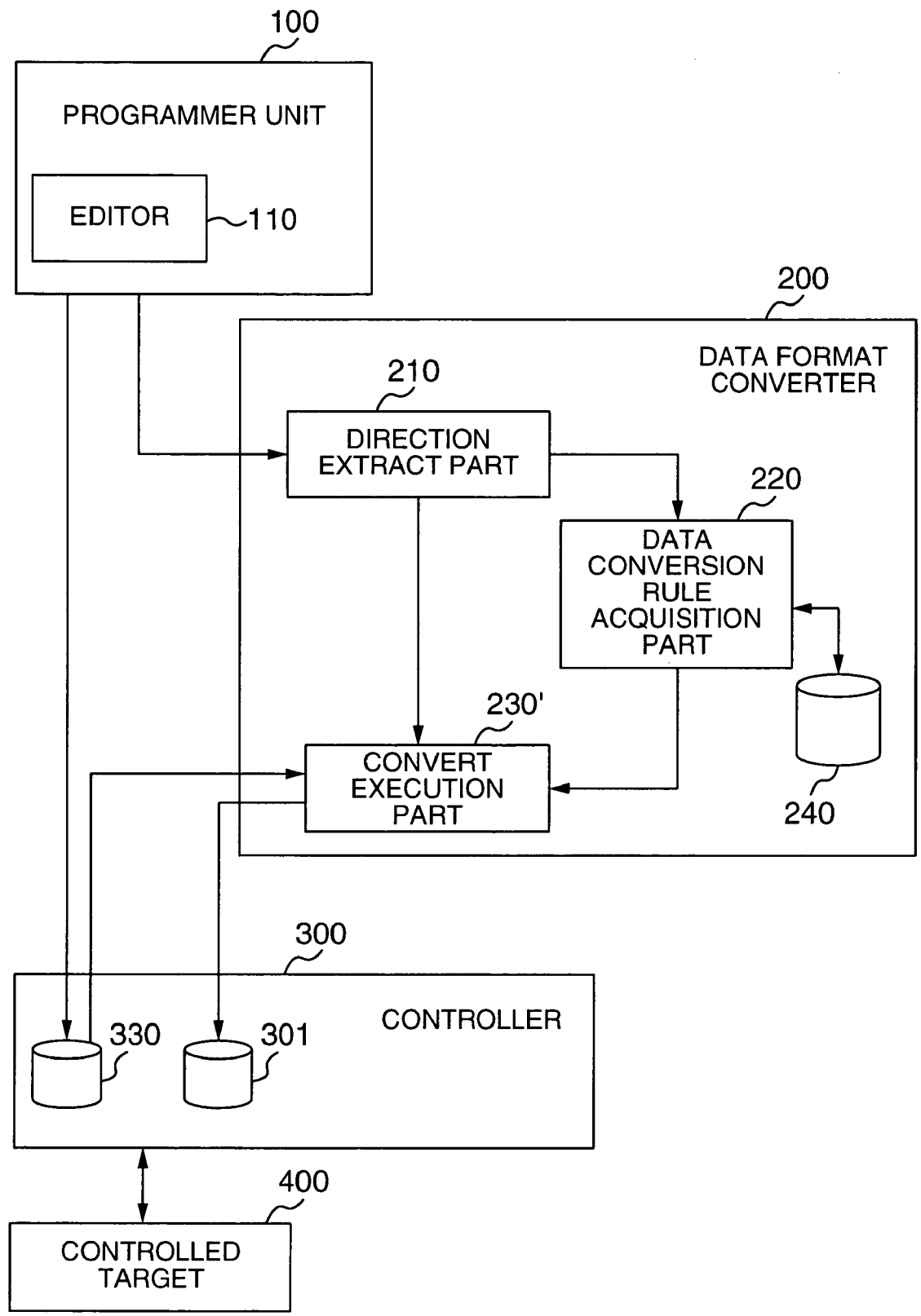
FIG. 11 shows an overall construction of a control management system according to a fifth embodiment of the invention.

FIG. 11 shows an overall construction of a controller management system according to still another embodiment of the invention. This embodiment is different from the foregoing embodiments in the following point. Namely, the controller 300 includes a memory 330 separately from the memory 301. This memory 330 can store the data transmitted from the programmer unit 100 and the convert execution part 230' can acquire the data from the memory 330.

Figure 12:
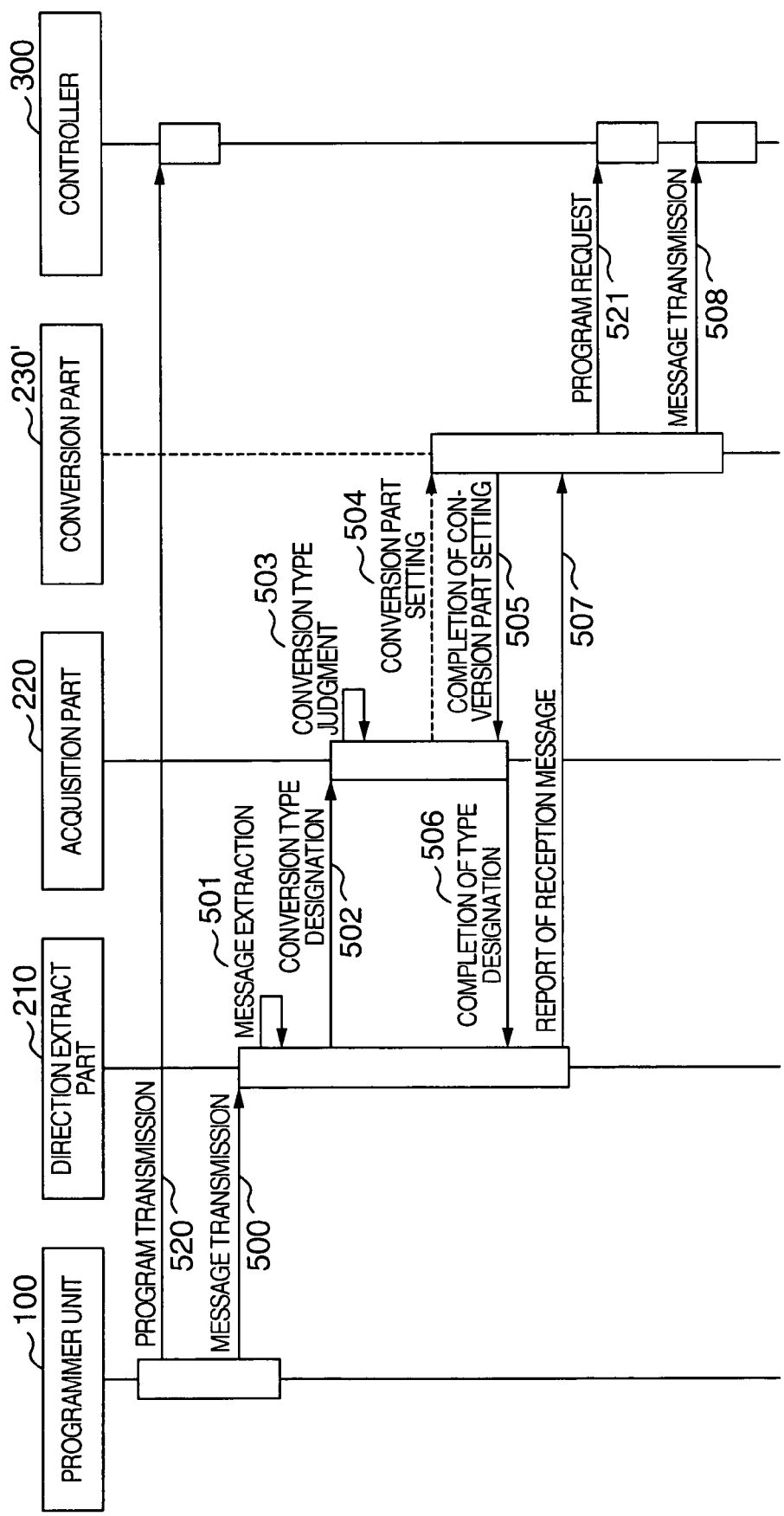
FIG. 12 is a sequence diagram useful for explaining an operation of the control management system shown in FIG. 11.

FIG. 12 is a sequence diagram of the flow of processing in this embodiment. Digits allocated to events in the sequence diagram of FIG. 12 are the same as the events shown in FIG. 5 unless specified otherwise. The programmer unit 100 transmits a created program part to the memory 330 of the controller 300 (event 520). The message from which the program part is omitted is transmitted to the data format converter 200 (event 500). Here, the message contains information representing that the program, etc, are stored outside. Preferably, URL (Uniform Resource Locator) information storing the program is contained as an attribute of a tag representing the program part. The subsequent events 501 to 507 are the same as the corresponding events in FIG. 5. The convert execution part 230' receives the report of the reception message in the event 507, recognizes that the program is stored outside, and requests the controller 300 to send the program (event 521). Thereafter, the convert execution part 230' converts the program from the message reported from the direction extract part 210 and from the program acquired and transmits the message to the controller 300 (event 508).

An original of the program, etc, for controlling the controller 300 are often required for management even after the program, etc, are created. According to this embodiment, the controller holds by itself the original of the program created. Therefore, not only the programmer unit 100 developing the program but also other programmer units can conduct modification and reference of the program without conducting reverse conversion of the data format by gaining access to the controller 300.

According to the embodiment described above, the controller 300 preserves the original of the program, etc, preferably the original of the program described in the XML format, created by the programmer unit 100 in addition to the effect of the embodiment shown in FIG. 1. Therefore, even when a different apparatus replaces the programmer unit 100, management of the program, etc, of the controller 300 can be easily made for a long time.

Sixth Embodiment

Figure 13:
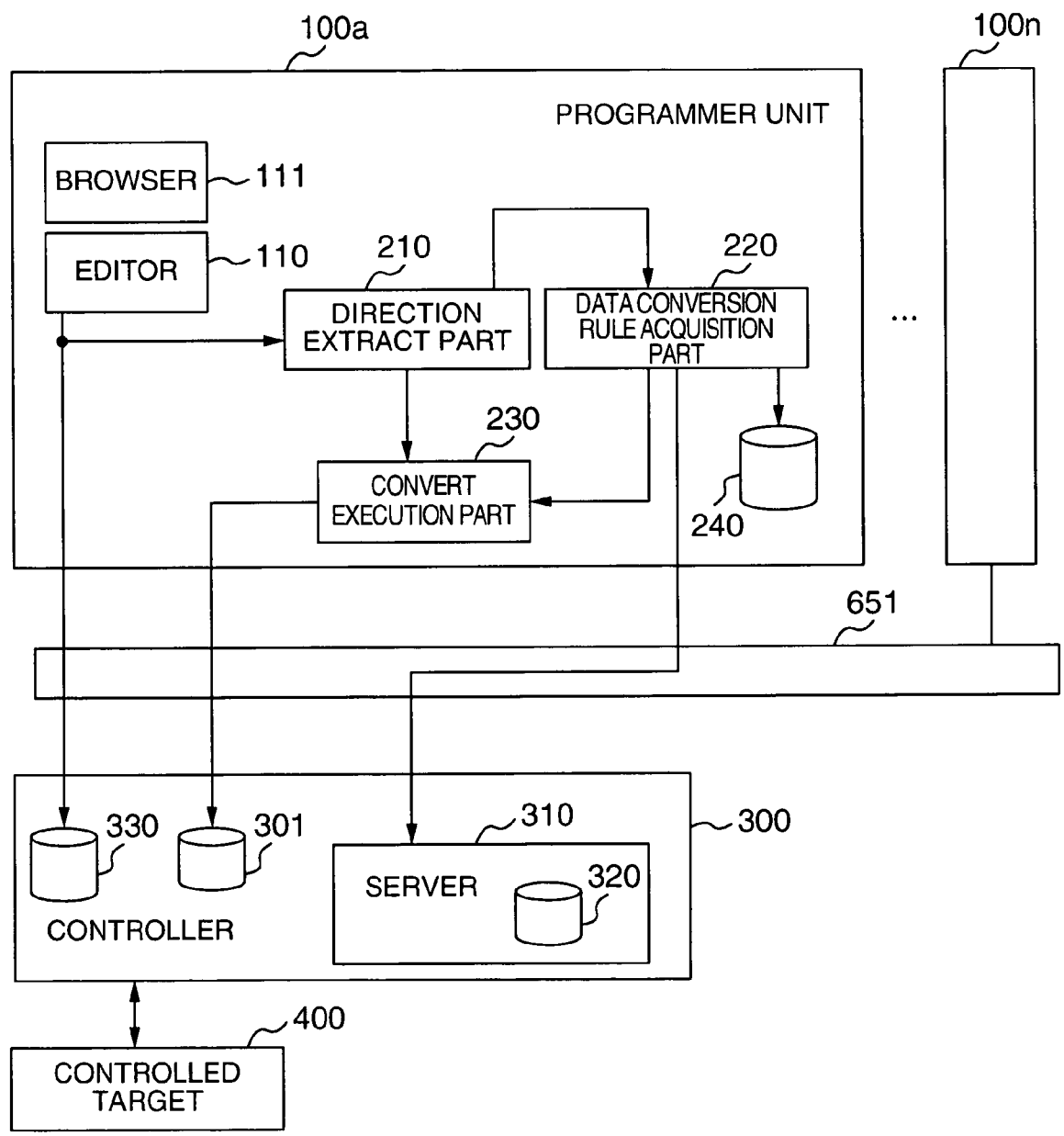
FIG. 13 shows an overall construction of a control management system according to a sixth embodiment of the invention.

FIG. 13 shows an overall construction of a controller management system according to still another embodiment of the invention. In comparison with the foregoing embodiments, this embodiment is different in the following points. Namely, each programmer unit 100a to 100n includes a browser 111. Each programmer unit 100a to 100n has a function of a data format converter. The controller 300 includes a memory 301, a memory 330, a server 310 and a memory 320. The programmer units 100a to 100n are connected to the controller 300 through the communication network 651.

Figure 14:
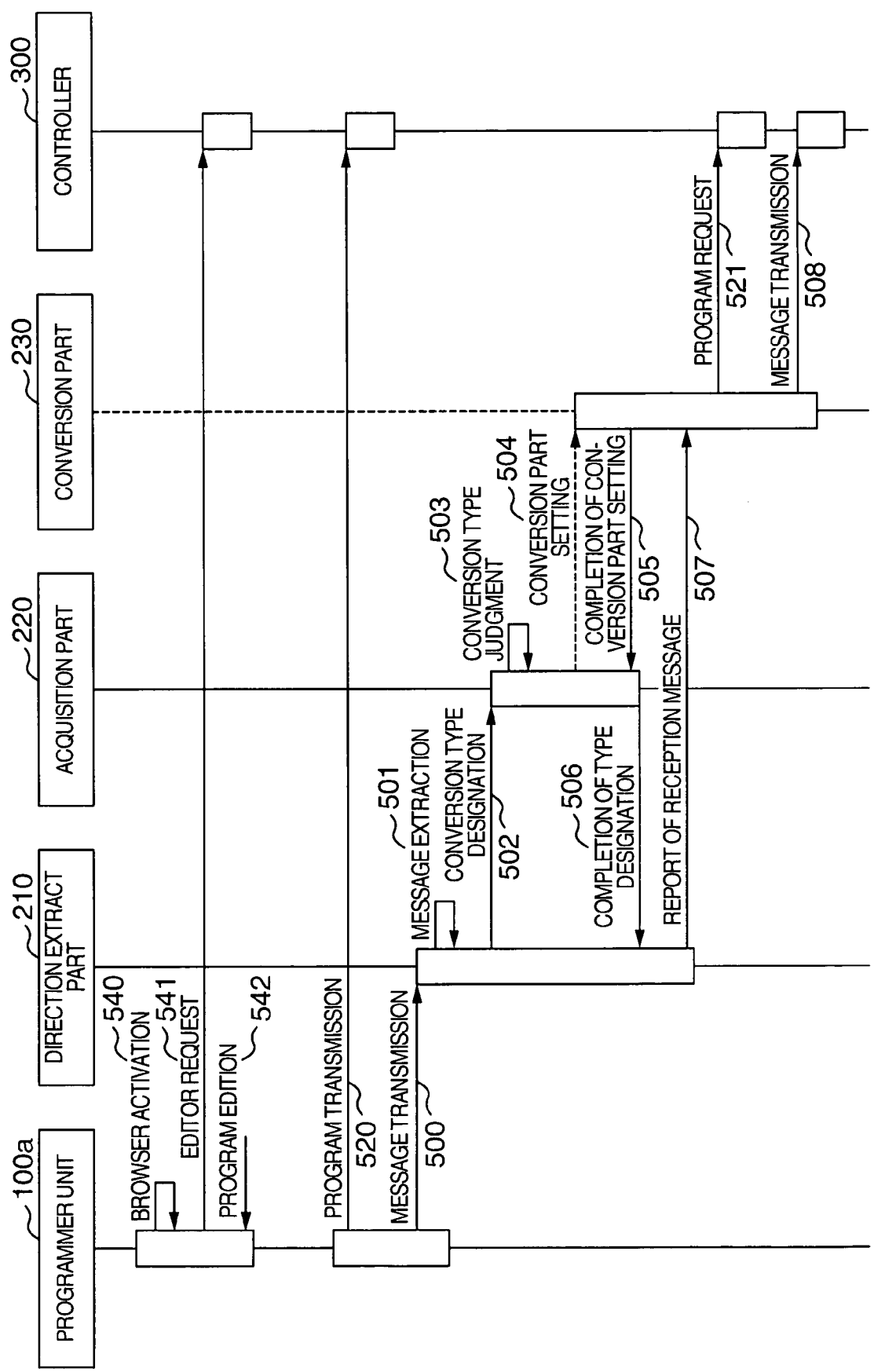
FIG. 14 is a sequence diagram useful for explaining an operation of the control management system shown in FIG. 13.

The flow of processing in this embodiment will be explained with reference to a sequence diagram shown in FIG. 14. Digits allocated to events shown in FIG. 14 are the same as the events shown in FIG. 12 unless specified otherwise. First, the programmer unit 100a activates the browser (event 540). Next, the programmer unit 10a request the controller 300 to supply the program of the editor 110 upon user's instruction (such as input of URL) (event 541). When the editor 110 is prepared by using an intermediate language program such as a Java byte code, the controller 300 need not prepare a conversion program for architecture of the programmer unit. The programmer unit 100a describes the program for the controller by use of the editor 110 so acquired (event 542). The operation ranging from the event 520 to the event 508 is the same as the events shown in FIG. 12.

According to this embodiment, the programmer units 100a to 100n can prepare and edit the program of the controller 300 even when they do not have the program of the controller 300 and the data about the controller 300. The program for controlling the controller 300 can be managed among different programming units when the controller 300 stores program edition means such as the editor. For example, it is possible to manage the program of one controller from a plurality of cellular telephone units executed VM of Java. In other words, computers such as the cellular telephone units can be utilized as the programmer unit when the editor and the conversion object are prepared in the form of the intermediate language program such as the Java byte code. As a result, the controller 300 can be managed without the limitation of the place and the time.

The construction of this embodiment makes it possible to omit the memory unit 240. Consequently, the programmer unit 100 can be constituted more economically.

Seventh Embodiment

Figure 15:
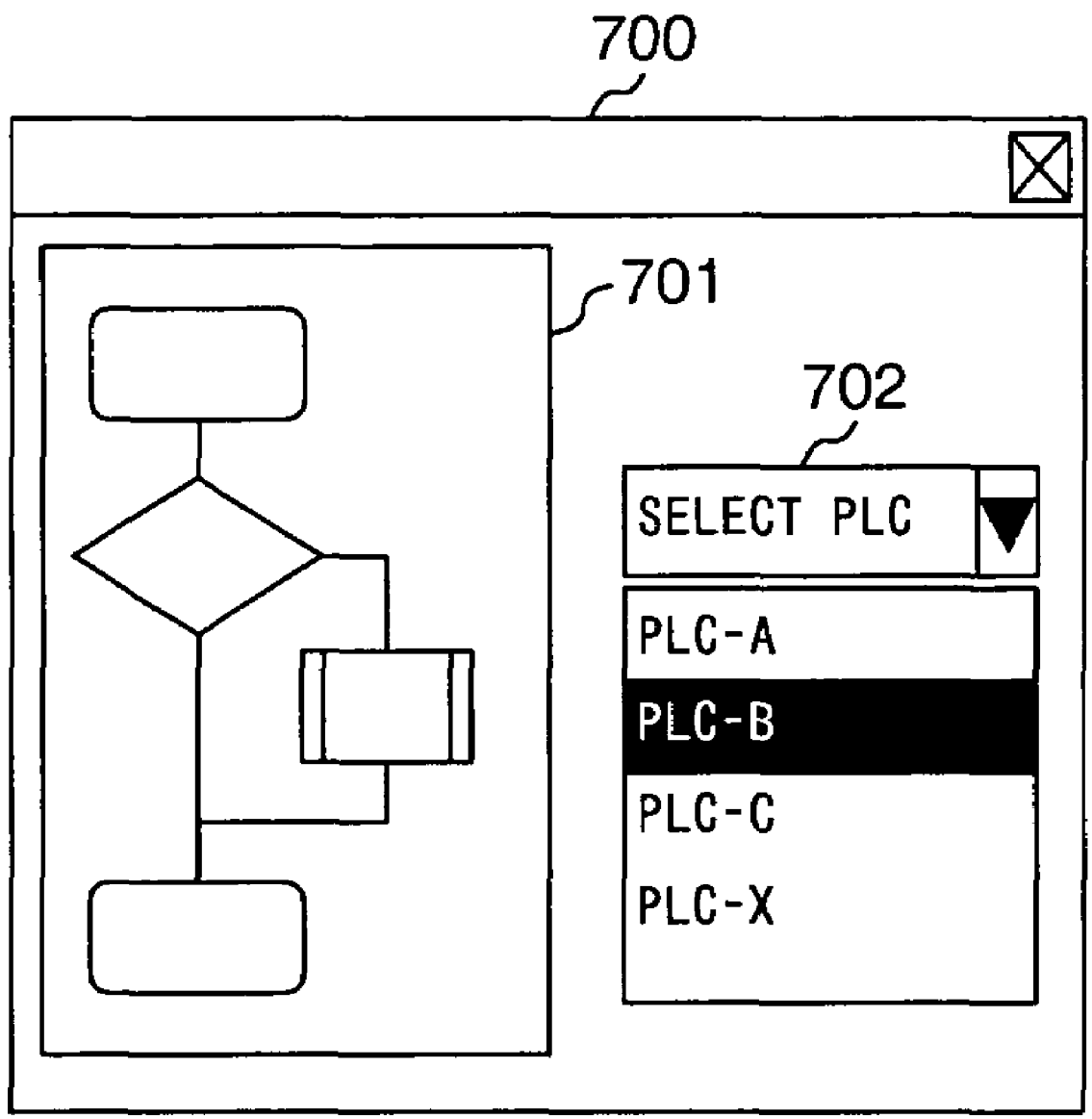
FIG. 15 shows an example of a program edition screen of a programmer unit according to a seventh embodiment of the invention.

FIG. 15 shows an example of an edition screen of a programmer unit according to an embodiment of the invention. A main window 700 has an edit screen 701 and a controller type selector 702. A user working out the program, etc, of the controller edits the program, etc, for controlling the controller 300 on the edit screen 701. A control description language according to IEC61131-3, for example, can be utilized. Alternatively, description by text may be possible. Further, the user decides to which suitable type for the controller the program of the standard format created by the editor should be converted by selecting "PLC-B" from among "PLC-A, PLC-B, PLC-C, PLC-X", for example, by operating the controller type selector 702 as shown in the drawing. The type the user selects by operating the control type selector 702 is reflected either directly or indirectly on the data representing the controller type shown in FIG. 2.

As described above, the data format converter according to the invention can convert the data format of the program, etc, to a different data format.

The controller management system according to the invention can manage controllers of different kinds and has high versatility and high flexibility.

The controller management system according to the invention can manage and control different kinds of controllers from a remote place.

What is claimed is:

1. Data format conversion equipment comprising
a computer, said computer comprising:
reception means for acquiring input information containing a program of a first data format from a communication network;
direction extract means for extracting a convert direction of a data format contained in said input information so acquired;
data conversion rule acquisition means for acquiring a conversion rule of a data format corresponding to said convert direction extracted;
convert execution means for converting the program of the first data format to a program of a second data format on the basis of said conversion rule acquired; and
transmission means for outputting the converted program to said communication network, wherein said data format conversion equipment further comprises:

memory means for storing a conversion rule for converting the program of the first data format to the program, etc, of the second data format, wherein said memory means stores a plurality of conversion rules for executing conversion to a plurality of different second data formats in such a manner as to correspond to at least one first data format, and said data conversion rule acquisition means acquires a conversion rule corresponding to said convert direction from said memory means, and wherein said data conversion rule acquisition means acquires said conversion rule stored in memory means provided outside from said communication network through said reception means.

2. Data format conversion equipment as defined in claim 1, wherein said memory means provided outside is memory means connected to said communication network in such a manner as to be capable of communication, or memory means provided to a controller having an embedded computer connected to said communication network in such a manner as to be capable of communication.

3. Data format conversion equipment as defined in claim 1, wherein said conversion rule is a conversion program for converting the first data format to the second data format, and said convert execution means converts the program of the first format to the second data format in accordance with said conversion program.

4. Data format conversion equipment comprising a computer, said computer comprising:

communication means for acquiring input information containing a program, etc, of a first data format from a communication network;

direction extract means for extracting a convert direction of a data format contained in said input information so acquired;

data conversion rule acquisition means for acquiring a conversion program for executing conversion to a data format corresponding to the convert direction so extracted from outside through said communication means; and convert execution means for converting the program of the first data format to a program of a second data format on the basis of said conversion program so acquired, and outputting the converted program to said communication network through said communication means, wherein said conversion program converts the program to a program of a third data format different from the first and second data formats, and then converts the program to the second data format.

5. Data format conversion equipment as defined in claim 4, wherein said data conversion rule acquisition means gains access to memory means provided outside through said reception means and acquires said conversion program from said communication network.

6. Data format conversion equipment as defined in claim 4, wherein said convert execution means comprises a virtual machine and intermediate conversion means for converting a program etc, to a third data format.

7. Data format conversion equipment as defined in claim 6, wherein said virtual machine is a virtual machine of Java.

* * * * *